(12) United States Patent
Blomqvist et al.

(10) Patent No.: US 10,126,834 B2
(45) Date of Patent: Nov. 13, 2018

(54) ELECTRONIC DEVICE AND A METHOD FOR CONTROLLING THE FUNCTIONS OF THE ELECTRONIC DEVICE AS WELL AS PROGRAM PRODUCT FOR IMPLEMENTING THE METHOD

(71) Applicant: Conversant Wireless Licensing S.a r.l., Luxembourg (LU)

(72) Inventors: Mikko Blomqvist, Tampere (FI); Tommi Laine, Tampere (FI); Miia Onkalo, Nokia (FI)

(73) Assignee: Conversant Wireless Licensing S.A.R.L., Luxembourg (LU)

(*) Notice: Subject to any disclaimer, the term of this patent is extended or adjusted under 35 U.S.C. 154(b) by 116 days.

(21) Appl. No.: 14/602,512

(22) Filed: Jan. 22, 2015

(65) Prior Publication Data

US 2015/0138090 A1 May 21, 2015

Related U.S. Application Data

(63) Continuation of application No. 11/658,047, filed as application No. PCT/FI2005/050292 on Aug. 16, 2005, now Pat. No. 8,970,490.

(30) Foreign Application Priority Data

Aug. 17, 2004 (FI) .................................... 20045300

(51) Int. Cl.
*G06F 3/03* (2006.01)
*G06F 1/16* (2006.01)
(Continued)

(52) U.S. Cl.
CPC .......... *G06F 3/0304* (2013.01); *G06F 1/1626* (2013.01); *G06F 1/1686* (2013.01);
(Continued)

(58) Field of Classification Search
CPC ....... G06F 3/0304; G06F 3/005; G06F 3/0346
See application file for complete search history.

(56) References Cited

U.S. PATENT DOCUMENTS 6,298,144 B1 * 10/2001 Pucker, II ............. G06T 7/2053
348/155
7,315,751 B2 * 1/2008 Kurakane ............. G06F 1/1616
345/157

(Continued)

*Primary Examiner* — Sahlu Okebato
(74) *Attorney, Agent, or Firm* — Borden Ladner Gervais LLP

(57) ABSTRACT

The invention relates to an electronic device, which includes a display component, in which at least one controllable element is arranged to be visualized in its entirety, the control of which element is arranged to be based on determining a change (M) relating to the attitude or position of the device and camera means arranged to form image frames (IMAGE1, IMAGE2), and in which, in order to control the functions of the device, such as, for example, to control the element, the change is arranged to be determined, using optical data-flow algorithms, from the image frames formed by the camera means, which image frames are arranged to be compared to each other in a set manner, and on the basis of which comparison the said change is arranged to be determined. The image frames are arranged to be segmented in a selected manner, from which at least one movement vector ($S_R$, $S_L$, $S_{Up}$, $S_{Down}$) determining the said change is arranged to be determined from at least some of the segments (SEGMENT1, SEGMENT2).

17 Claims, 7 Drawing Sheets

(51) Int. Cl.
*G06F 3/00* (2006.01)
*G06F 3/0346* (2013.01)
*H04M 1/725* (2006.01)

(52) U.S. Cl.
CPC ............ *G06F 3/005* (2013.01); *G06F 3/0346* (2013.01); *G06F 2200/1637* (2013.01); *H04M 1/72544* (2013.01)

(56) References Cited

U.S. PATENT DOCUMENTS

| | | | |
|---|---|---|---|
| 7,359,713 B1* | 4/2008 | Tiwari | G01S 19/34 342/105 |
| 2006/0146009 A1* | 7/2006 | Syrbe | A63F 13/00 345/156 |

* cited by examiner

ELECTRONIC DEVICE AND A METHOD FOR CONTROLLING THE FUNCTIONS OF THE ELECTRONIC DEVICE AS WELL AS PROGRAM PRODUCT FOR IMPLEMENTING THE METHOD

CROSS-REFERENCE TO RELATED APPLICATIONS

This patent application is a continuation application of U.S. patent application Ser. No. 11/658,047, filed on Jan. 19, 2007. U.S. patent application Ser. No. 11/658,047 is a national stage filing of International Patent Application No. PCT/FI2005/050292, which was filed on Aug. 16, 2005. International Patent Application No. PCT/FI2005/050292 claims priority from FI 20045300, which was filed on Aug. 17, 2004. U.S. patent application Ser. No. 11/658,047, International Patent Application No. PCT/FI2005/050292, and FI 20045300 are incorporated herein by reference.

TECHNICAL FIELD

The present invention relates to an electronic device, which includes a display component, in which at least one controllable element is arranged to be visualized in its entirety, the control of which element is arranged to be based on determining a change relating to the attitude or position of the device, relative to at least one selected fixed point, and camera means arranged to form image frames, and in which, in order to control the functions of the device, such as, for example, to control the said element, the said change is arranged to be determined, using optical data-flow algorithms, from the image frames formed by the camera means, which image frames are arranged to be compared to each other in a set manner, and on the basis of which comparison the said change is arranged to be determined. In addition, the invention also relates to a corresponding method and program product for implementing the method in an electronic device.

BACKGROUND

Already quite highly developed user interface concepts are known at present from electronic portable devices, such as mobile stations, PDA (Personal Digital Assistant) devices, and digital cameras. The user interface visualized on the display of the device is used to control the functions of the device and through that can also be input or examine information presented in applications. The simplest implementation of a user interface according to the prior art is, for example, as hierarchal menu solutions.

Various graphical user interfaces (GUI, Graphical User Interface), which are represented, for example, by various icon-type solutions, are already known from some more highly developed electronic devices. Generally, the display component of the device, which nowadays can be implemented in colour, is used to show the user interface to the user.

In some already existing devices, or at least in devices that it is intended to bring onto the market in the future, various three-dimensional displays and/or 3D user-interface/application environments will become common. Such displays can be applied, for example, in game applications.

The prior art for controlling the user interfaces and applications of the devices, and for processing information is represented by various moveable indicator element type solutions. Some examples of these are pointer cursors and menu selectors. In the most basic of these solutions, the currently active selection alternative can be shown in a way that distinguishes it from the other alternatives. In graphical user interfaces, the position and directions of movement of the pointer cursor, which can be shown on the display component using, for example, some graphical element, can be nearly arbitrary. Thus, for example, when selecting a desired selection alternative, the control means of the user interface are used to move the pointer cursor on top of the desired selection item, and the selection is confirmed.

In this case, the control means can be understood as being various data entry means in general, so that besides moving the pointer cursor, they can be used, for example, to navigate the menus, to control the behaviour of characters in game applications, to enter information such as such text in the device, to make selections, to activate applications, and in general to control the operation of the device.

Numerous different control-means solutions for moving the pointer cursor are known, by means of which data can also be entered in the device. Some examples of these are a keypad, special keys located in the keypad component, such as, for example, navigation keys, and joystick controllers. Their operating principle is generally based on a vector, the direction of which is defined by the user using the control means.

In addition to the above, various touchscreens can also be mentioned, touching which allows the pointer cursor to be moved in the user interface. Some devices are also known, in which there is no actual data-entry mechanism at all. As one example a reference can be made to a voice control implemented using a microphone.

A special user panel, using which a pointer cursor visualized in the user interface can be controlled, and which can be arranged on rear side, i.e. the side opposite to the display component, of the portable device, is known from WO patent publication 02/093880 A2. This too is a case of a touch-sensitive base, on the surface of which the user can move their finger, while holding the device in the same hand. Although such a device frees the other hand for other tasks, it is nevertheless relatively impractical, for example, from the user's point of view. The touch-sensitive panel arranged on the rear side of the device specially for controlling the pointer cursor increases the manufacturing costs of the device and is also liable to be knocked. In addition, when holding the device in one hand, while using a finger of the same hand to control the pointer cursor, the operating position of the hand and fingers is in no way ergonomic, instead the finger is subject to considerable stress when moving over the panel. This drawback is particularly aggravated when the solution is applied in small devices.

As one data-entry/control method, reference can also be made to the use of acceleration sensors for determining the movements affecting a device and, as a result, for moving the element. In this case, the sensor can determine the movement, or change in position or location relative to a fixed point, affecting the device, from which a direction vector can be formed, according to which the element is then controlled in the user interface. In such a use situation, the user can, for example, if desired navigate to the next theme on the right, by turning the device slightly to the right and then turning it back towards themselves.

However, the data-entry solutions referred to above, which mainly relate in one way or another to the use of fingers, are difficult to control, for example, when wearing gloves. Due to their small size, the keys are outside of the resolution of the gloves, and keying errors can't always be unavoidable. When such a situation arises, it is very unpleasant for the user, as it shows a obvious defect in the smooth usability of the devices.

Yet another solution known from the prior art for controlling the functions of a device is the application of image information formed using camera means. When changing the direction of aim of the camera means, a directional vector, on the basis of which the functions of the device can be controlled, can be determined from sequentially captured shots. Such solutions are disclosed in, among others, Swedish patent publication 9902562-9 (Telefonaktiebolaget L M Ericsson) and British patent application GB 2 387 755 (NEC Corporation). Some other solutions are disclosed in US patent publication 2004/0012566 A1, U.S. Pat. No. 6,288, 704 B1, WO publication 2004/066615, and US patent publication 2004/0085455 A1.

The only 'finger-free' user interface's control and data entry method of those referred to above are the voice control of the device and the application of acceleration sensors and information formed using camera means. However, due to the diversity of the functions of the devices, the complexity of the user interfaces, and even their three-dimensionality, such forms of control are not, at least yet, at all easy to implement in terms of usability. The forms of implementation referred to above cannot be used to enter information into the device smoothly, or at all, to activate the functions of the device, or to control more complex applications, without the use of fingers. In addition, using acceleration/orientation sensors may involve not only making the devices more complicated, but also problems on the hardware level. The application of camera means may also reduce the precision of the cursor indication.

SUMMARY

The present invention is intended to create a new type of electronic device and a corresponding method for use in the device for controlling the functions of the electronic device. According to an embodiment of the invention, an electronic device includes a display component, in which at least one controllable element is arranged to be visualized in its entirety, the control of which element is arranged to be based on determining a change (M) relating to the attitude or position of the device relative to at least one selected fixed point and camera means arranged to form consecutive image frames (IMAGE1, IMAGE2), and in which, in order to control the functions of the device, such as, for example, to control the said element, the said change (M) is arranged to be determined, using optical data-flow algorithms, from the consecutive image frames (IMAGE1, IMAGE2) formed by the camera means, which consecutive image frames are arranged to be compared to each other in a set manner, and on the basis of which comparison the said change (M) is arranged to be determined, wherein the consecutive image frames (IMAGE1, IMAGE2) are arranged to be segmented in a selected manner, from which at least one movement vector ($S_R$, $S_L$, $S_{Up}$, $S_{Down}$) defining the said change (M) is arranged to be determined from at least some of the segments (SEGMENT1, SEGMENT2).

According to another embodiment of the invention, a method for controlling the operations of an electronic device, in which the operations of the device, such as, for example, controlling of at least one element arranged to be visualized in its entirety and controlled on the display component, is based on determining a change (M) relating to the attitude or position of the device (10) relative to at least one selected fixed point, and in which method camera means are used to form consecutive image frames (IMAGE1, IMAGE2) in order to determine the said change (M), using optical data-flow algorithms, which are compared to each other in a set manner and on the basis of which comparison the said change (M) is determined, where the consecutive image frames (IMAGE1, IMAGE2) are segmented in a set manner, for at least some of which segments (SEGMENT1, SEGMENT2) at least one movement vector ($S_R$, $S_L$, $S_{Up}$, $S_{Down}$) defining the said change (M) is determined.

According to another embodiment of the invention, disclosed is a program product for implementing the method according to the invention in an electronic device, which program product includes a memory medium (MEM) and program code to be executed using processor means and written on the memory medium (MEM), which program code is arranged to control the functions of the device, such as, for example, at least one element arranged to be visualized in its entirety and controlled on the display component, based on defining a change (M) relating to the attitude or position of the device relative to at least one selected fixed point, and in which the program code includes code means configured to determine the said change (M) from the consecutive image frames (IMAGE1, IMAGE2) formed by camera means using the optical data-flow algorithms. The program code is configured to compare the consecutive image frames (IMAGE1, IMAGE2) with each other in a set manner and, on the basis of which comparison, the program code is arranged to be determined the change (M) in the attitude or position of the device relative to at least one fixed point selected from the consecutive image frames (IMAGE1, IMAGE2). The program code additionally includes code means configured to segment the consecutive image frames (IMAGE1, IMAGE2) in a selected manner, from at least some of the segments (SEGMENT1, SEGMENT2) the change (M), relating to the attitude or position of the device (10) relative to the selected fixed point, is arranged to be determined as at least one movement vector (S, $S_R$, $S_L$, $S_{Up}$, $S_{Down}$).

Owing to the invention, the functions of the device can be controlled in a new and surprising manner. The control means in the device according to the invention consist of camera means. According to the method, the functions of the device are controlled by aiming a change to the attitude or the position of the device relative to at least one selected fixed point. The change can be determined from the image frames formed using the camera means. On the basis of the aimed change of attitude or the position of the device thus determined, a set control operation concerning at least one element shown in its entirety on the display component is aimed, or, stated even more generally, the functions of the device are controlled.

The definition of the change of attitude or position of the device can be performed, according to some embodiments, for example, using image recognition algorithms and/or optical data-flow algorithms. Thus the image frames can be segmented in the desired manner. A motion vector, according to the motion of which an element in the display can be controlled, defining at least one change, can then be determined from at least some of the segments.

Numerous parameters can be determined from the changes of attitude or position of the device relative to at least one selected fixed point, which changes can, in a surprising manner, according to the invention be made in even several dimensions. Some examples of these are changes in direction, magnitude, and/or even speed.

Camera means that are suitable for the invention can be, as such, already known from devices, which are used, for example, in still and video imaging. In certain situations, it may be possible to use even less demanding camera means. According to one embodiment, the camera means can include at least two image sensors. The image sensors can be directed to different sides of the device. This makes it possible to improve control precision, among other things.

The use of the invention will achieve several significant advantages. A first advantage is 'finger-free' menu navigation of the device and the performing of selections on the basis of movements and/or attitude/position changes of the device, or more particularly of its camera means. A second advantage that can be mentioned is the surprisingly fingerless entry of information in the device, such as, for example, text entry. A third advantage that can be mentioned is a more physical grip, for example, when controlling game applications.

The method according to the invention can be implemented in electronic devices, using even existing camera means. The invention allows implementation of a device completely without finger-operated control means. In addition, the invention improves, for example, the robustness of the keypad component, while also reducing costs arising from manufacture of the keypad in which the particular joystick implementations play in general significant portion of costs. By replacing mechanical control means, which wear over time, with the optical solution according to the invention, the operating life of the device will also be extended.

One of the most important advantages achieved is the improved operating comfort of the device. Because the device is held in the hand while examining the user interface or using an application, the elements that can be moved on the display or the items that can be activated can then be controlled very easy with a small movement of the hand to call up a desired function and, on the other hand, also to activate it.

The method according to the invention can be integrated quite simply in both existing electronic devices and in those that are still in the design stage. The method according to the invention does not add to the complexity of the device to such an extent that it would be a significant drawback, for example, to the devices' processing power or memory use. According to one embodiment, the method feasible even as a purely program-level implementation, can be integrated very easily in devices including camera means or a similar functionality.

According to some embodiments, the operating state of the camera means can be adjusted for the control of the functions of the device, for example, to suit the current operating situation. For example, it is thus possible to adjust the camera means' image information formation frequency, or the frequency of the performance of the application determining the change in the attitude or position of the device. Principally however, the formation of image information can be performed, for example, from real-time video information, from the changes in which the corresponding change in the attitude or the position of the device relative to at least one selected fixed point can be determined. On the other hand, it is not obligation to use all the frames from the real-time image flow.

Other characteristic features of the invention will become apparent from the accompanying Claims while additional advantages achieved are itemized in the description portion.

BRIEF DESCRIPTION OF THE DRAWINGS

The invention, which is not restricted to the embodiments described in the following, is examined in greater detail with reference to the accompanying figures, in which.

DETAILED DESCRIPTION OF VARIOUS EMBODIMENTS

Nowadays, many electronic devices 10 include a graphical operating system (GUI, Graphical User Interface). In the case of the invention, the electronic device 10 can be understood, for example, to be a mobile station, or equally also a PDA (Personal Digital Assistant) device in the form of a 'smart communicator', Palm-type devices being one example. The device 10 can also be understood to be a digital camera device, a portable game console, or in general an electronic device, which is equipped, or which can be equipped with a digital imaging functionality. Thus, the concept 'electronic device' can be understood extremely widely. In the following, the invention is illustrated, by way of example, in connection with a mobile station 10 equipped with camera means.

Figure 1A:
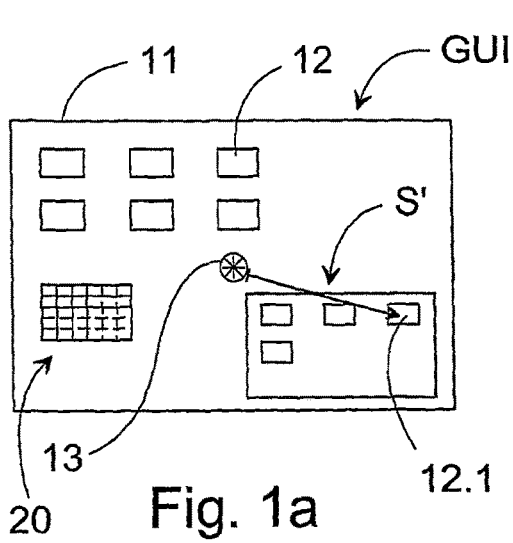
FIGS. 1a and 1b show example of the user interface.
Figure 1B:
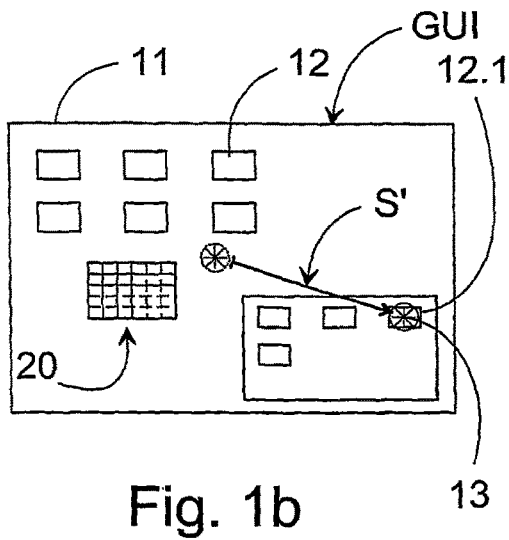

FIGS. 1a and 1b illustrate one example of a user interface GUI appearing on the display 11 of a device 10, by means of which the operating system of the device 10, and thus also the functions of the device 10, can be controlled. The user interface GUI and the applications 12, 20, which can be executed using the device 10, are usually displayed to the user precisely on the display component 11 of the device 10.

At least one controllable element 13 is visualized for the user on the display component 11. In the case of the user interface GUI, this can be a controllable indicator element 13, which, in the case shown, is a cursor 13. In addition, the element 13 is characterized by the fact that it is shown in its entirety on the display 11. In that case, the question is not only of cursor-type applications, but also of various types of data-input/selection (an example is given later), or characters in games.

Further, the device 10 also includes control means 14, 15, using which the user can control at least one element 13. In the invention, the control means are formed, surprisingly manner, of camera means 14, 15.

By using the control means 14, 15, it is possible to determine movements affecting the device 10 and more particularly changes M in its attitude and/or position relative to one or more fixed points. The control data formed by the control means 14, 15 are brought to the processor means 16 belonging to the device 10, by means of which, among other things, the control operations affecting the element 13 on the display 11, and which are at least partly determined from the changes M in the attitude and position of the device 10, are processed and implemented. The device 10 may also include a possible keypad 18.

In the case according to the embodiment, the pointer cursor 13 can be moved and controlled in the user interface GUI by the user, using the control means 14 arranged in the device 10. The pointer cursor 13 is expressed in this case, for example, by some graphical object, such as, for example, an arrow or a star, by which it is shown in FIGS. 1a and 1b. In FIG. 1a, the pointer cursor 13, can be imagined as being at the default position on the display 11, for example, in which it is shown automatically when the device 10 is switched on. One example of such a default position is the vicinity of the centre of the user interface GUI.

In FIG. 1b, the user has moved the pointer cursor 13 to the desired point in the user interface GUI, for example, to select a function 12.1 they desire. Possible selection points, such as, for example, functions, resources to be activated, etc., can be shown in several different ways in the user interface. They can be shown, for example, as icons 12, 12.1, as applications to be visualized, or as entry means 20 or text fields 23 (FIG. 7), on top of which the pointer cursor 13 can be moved. The user interface can be understood as a parallel term for the operating system GUI. After this, the selection is confirmed/activated in some set manner, such as, for example, by pressing a selection key on the keypad.

In the case according to the invention, at least one controllable element 13 can be understood very broadly in the case of the embodiments described more detailed in the following. On the one hand, it can be understood as a graphical point-element of existing more highly developed operating systems, which can be moved on the display component 11 essentially quite arbitrarily multi(two)-dimensionally, precisely as is shown in FIGS. 1a and 1b.

On the other hand, the indicator element can also be understood in a known manner from the user interfaces of more traditional devices, in which, for example, a one-dimensional menu list of the selection alternatives that are currently available can be browsed. One of the selection alternatives can be preselected at any one time, so that the alternative is differentiated from the others, for example, shown graphically (menu selector). One example of such can be brighter lighting or shadowing around the selection alternative, which can thus now also be understood as an indicator-element type functionality (not shown).

In general too, when using an indicator element (cursor or menu selector), it is moved on top of the currently desired selection alternative, after which the user can, in a set manner, activate/select/confirm the relevant selection alternative. A corresponding type of functionality is also known, for example, from graphical user interfaces of PC-computers.

Figure 5:
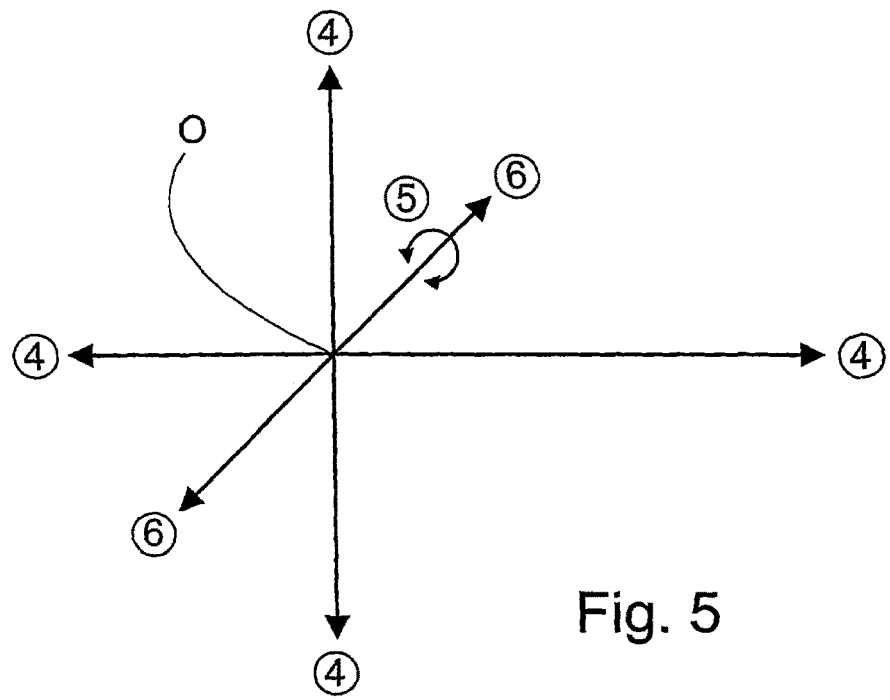
FIG. 5 shows an example of possible directions for changing the attitude or position of the device.

The movement, described above, of the indicator cursor 13 within the frame of reference of the user interface of the device 10 can be extended to the control of the device's 10 applications in general, such as, for example, the entry of text into the device 10 (FIG. 7), browsing an album of images, or controlling the behaviour of game characters in a game application, such as, for example, moving, turning, or even more complicated operations (for example, kicking). In order to permit the control of the functions, the change M can be aimed to the attitude or position of the device 10 relative to at least one selected fixed point even in three dimensions, including not only a horizontal-vertical movement that is, as such known (directions 4 in the set of co-ordinates), but also, surprisingly, rotational movements as changes in the attitude of the device 10 (direction 5 in the set of co-ordinates) clockwise and counter-clockwise (rotation of the device 10 around an axis imagined to run through the sensor 14), as well as a change in position of the device 10 as a position that moves closer to, and farther away from the user (movement of the device 10 in the depth level, direction 6 in the set of co-ordinates). FIG. 5 shows a corresponding set of co-ordinates relating to the possible directions.

Figure 2:
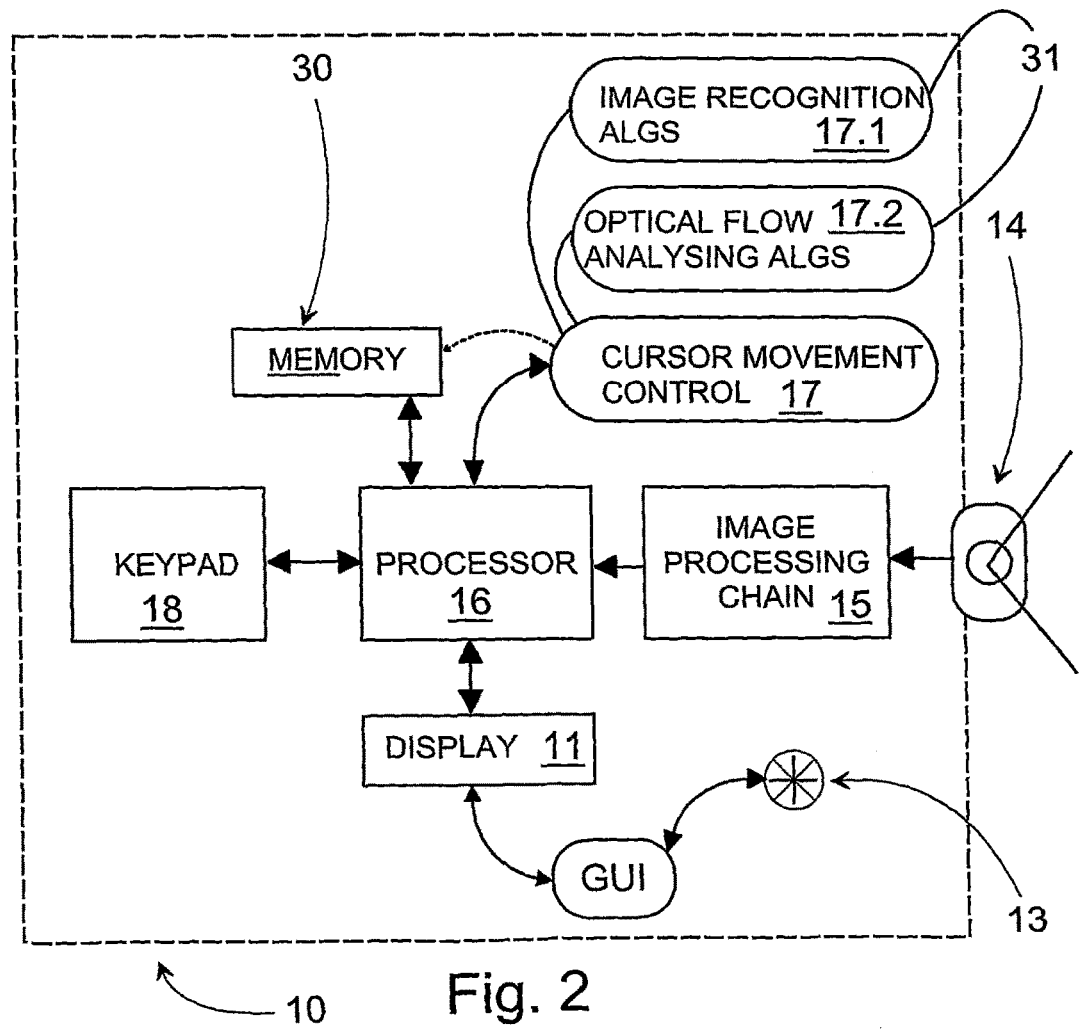
FIG. 2 shows a rough schematic diagram of the essential components of the device and program product according to the invention.

FIG. 2 shows a schematic and rough example of the functions of one device 10, which permit the method according to the invention. The device 10 can include operational components, shown in FIG. 2, which are, as such, conventional, of which the most essential in terms of the implementation of the device 10 according to the invention are the camera means 14, 15. In the solution according to the invention, it is surprisingly precisely these camera means 14, 15 that form the control means of the at least one element 13 that can be controlled on the display component 11. According to the method, the camera means 14, 15 can be used to form image information IMAGE1, IMAGE2, from which the change M affecting the attitude or position of the device 10 relative to at least one selected fixed point can be determined, and thus also the desired movement of the element 13 on the display 11, or some other management/control operation of the device 10.

The camera-sensor unit 14 and the image-processing chain 15 arranged in connection with it can be, as such, known (CCD, CMOS), by means of which it is possible to capture and process still and/or moving images. The general term 'camera means' refers to at least one sensor unit with its peripheral electronics, the associated imaging chain 15, and generally everything that is necessary to implement a digital imaging chain. On the other hand, even the lowest-grade sensor-/processor units, with properties that are not adequate for these purposes, may be considered, as a very demanding image-information detection functionality is not necessarily required to create the functionality according to the invention. The camera unit 14 can be permanently in the device 10, or it can also be detachably attached to the device 10, in which case the changes affecting the attitude or position of the device, or, on the other hand, also a change of attitude/position taking place in front of the camera 14 (for example, a hand) will be correspondingly registered using the camera means 14, 15.

Figure 3:
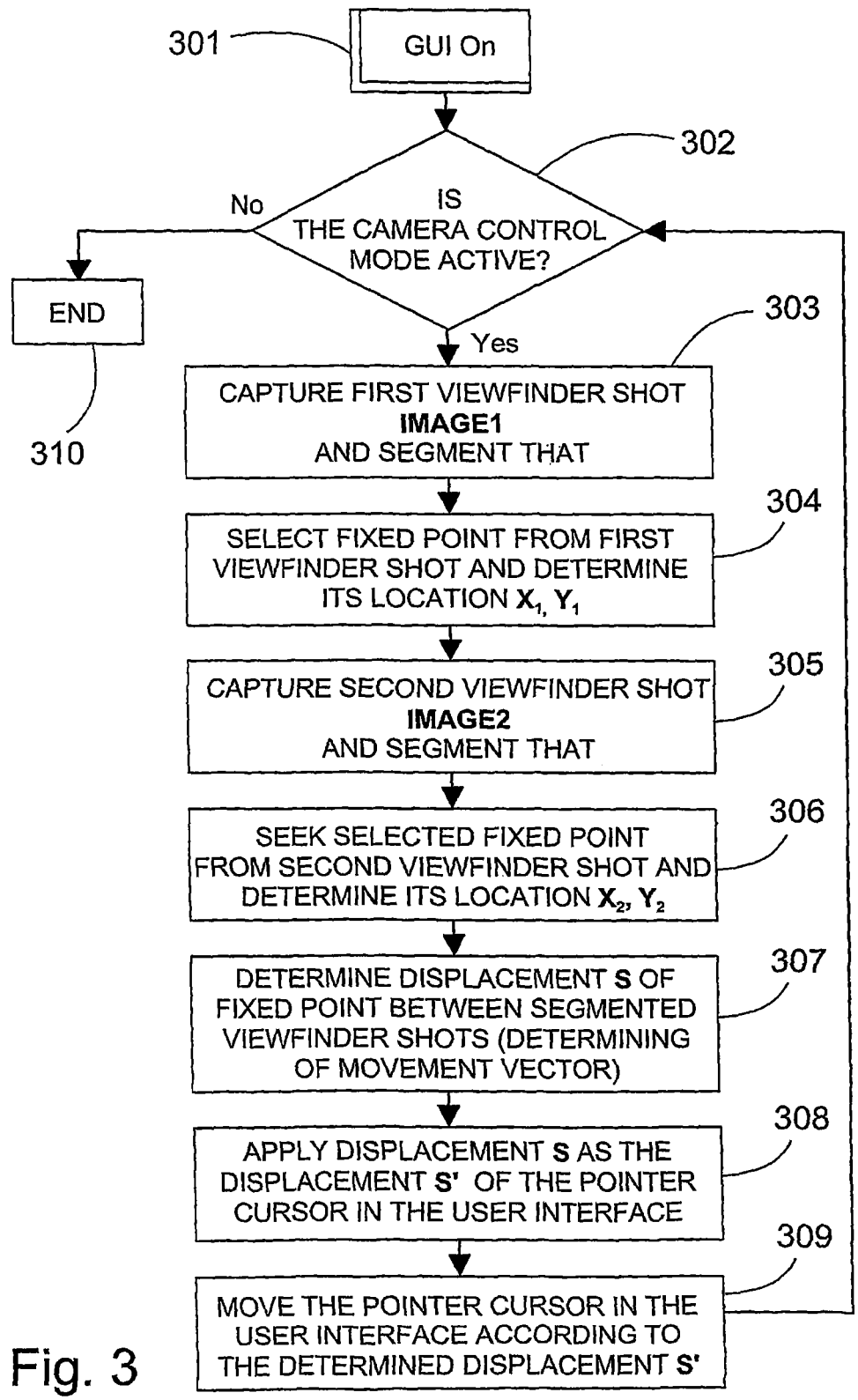
FIG. 3 shows a flow-diagram presentation of one embodiment of the method according to the invention.
Figure 4:
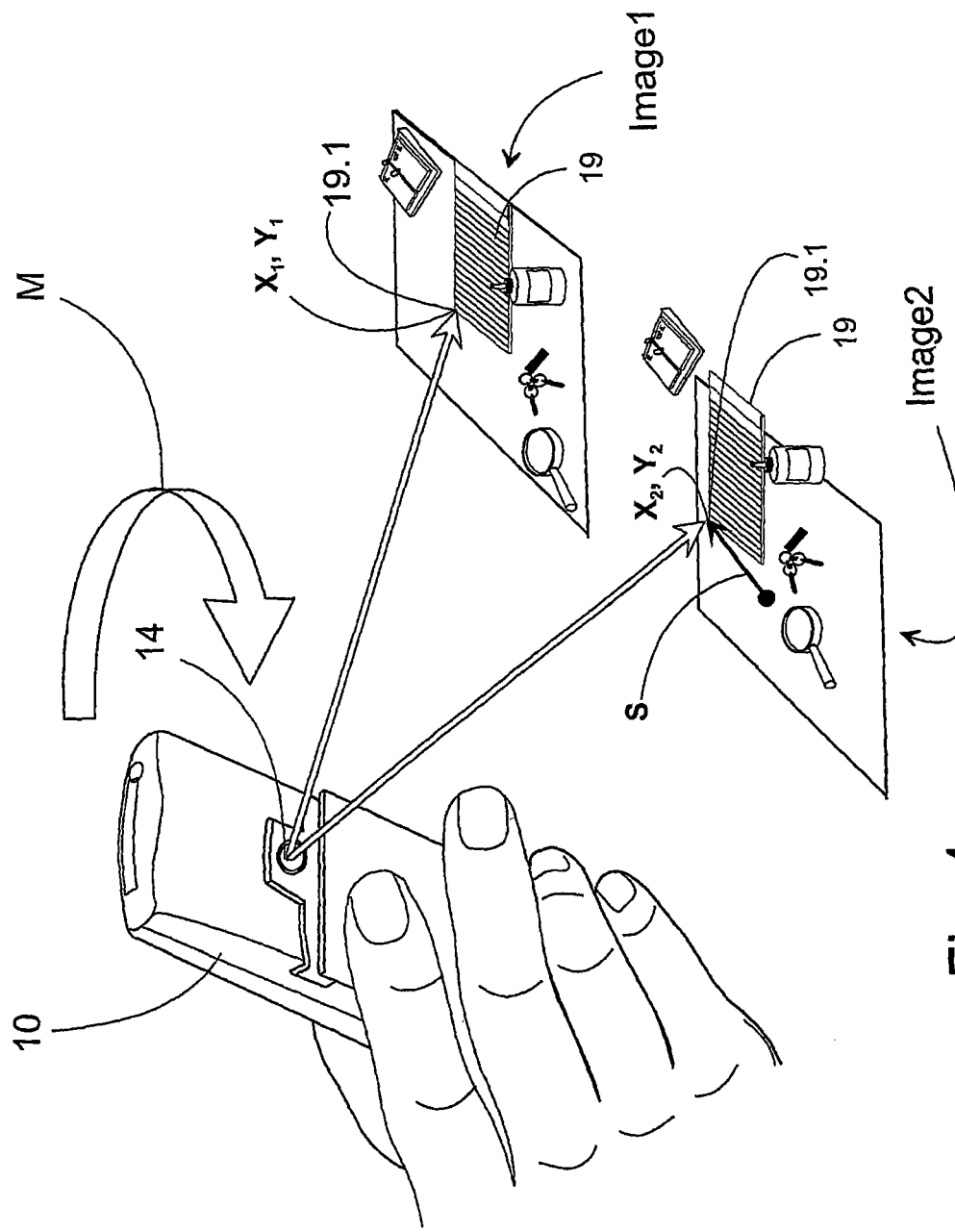
FIG. 4 shows a perspective view of an example of the method according to the invention when using the device.

FIG. 3 shows one example of the method according to the invention as a flow diagram, while also referring to FIGS. 1a and 1b, 4, and 6a-6c. When moving, in a manner according to the invention, an indicator cursor 13 in the user interface GUI, which is active on the display component 11 of the device 10, a particular camera-control mode (301, 302) according to the invention must be activated in the device 10. If the mode is not active, the cursor 13 can be controlled in some other suitable manner (310). In order to reduce the power consumption caused by the method, the functionality for determining the attitude or position of the device 10, and the image capture can be performed only when the user interface GUI of the device 10 is open. In addition, if operations are not directed to the user interface within a set time, the camera-control mode can be made passive, or at least the detection frequency of the camera 14 can be substantially reduced. When movement is again detected, the detection frequency of the camera means 14, 15 can be once again raised to the level set for it, in order to define the motion of the cursor 13. Such a feature can be used to reduce the power consumption of the device 10, when applying the invention.

According to one first embodiment, the camera-control mode is characterized by the indicator cursor 13 or other similar controllable element appearing in the user interface GUI being moved or generally controlled using a camera unit 14 arranged in connection with the device 10. The moving of the pointer cursor 13 is performed according to the view changes determined from the sequential still or video-image information samples detected by the camera means 14, which view changes correspond to changes in attitude/position affecting the device 10, relative to selected one or more fixed points.

According to one embodiment, the image information formed using the camera means 14, 15 includes sequential image frames, such as, for example, at least two image frames, viewfinder shots IMAGE1, IMAGE2. They can be essentially consecutive, or at least nearly consecutive according to a set criterion, depending, for example, on the operating mode (video imaging/viewfinder imaging) or detection frequency set for the camera means 14, 15. The shots IMAGE1, IMAGE2 are compared with each other in a set manner and in set parts. On the basis of the results obtained from the comparison, the movement M affecting the device 10, or even more particularly the change M in the attitude or position of the device 10 relative to a selected fixed point, can be determined.

In should be noted that, for moving the pointer cursor 13, the device 10 can still have in its keypad component 18 a traditional joystick/navigation-type key, in which there are, for example, in a suitable manner arranged arrow keys. The operating modes based on the camera means 14 and on the traditional navigation-key implementation can thus be alternatives, or even simultaneous.

If the pointer cursor 13 in the graphical user interface GUI is shown on the display 11 and the control mode of the pointer cursor 13 based on the camera means 14 is active, the view currently in front of the terminal 10 will be detected by the camera unit 14, in order to form continuous image information IMAGE1, IMAGE2 from it. In this embodiment, the camera unit 14 is on the rear side of the device 10, thus being on the opposite side to the display 11. According to one embodiment, a first viewfinder shot IMAGE1 is detected and captured by the sensor 14, for example, from a mainly real-time and continuous video-information data flow (303). The first viewfinder shot IMAGE1 is analysed in the image-processing chain 15 in a set manner, so that at least one or even several fixed points can be sought from it, such as, for example the fixed points 19.1 and their location $[X_1, Y_1]$ in the viewfinder shot IMAGE1 can also be determined from it (304).

The selection and definition of the fixed points can be made relatively freely. One example that can be mentioned is the definition of a fixed point, for example, from near to the centre point of the shot IMAGE1, if there is still no definite information as to the direction from which the following shot IMAGE2 will be taken in order to determine the change in the attitude or position of the device 10.

The actual fixed point can also be selected relatively freely. It can be an individual object, a shape, or a feature that can be identified from some object. In the embodiment according to FIG. 4, the user aims the device 10 by their desk, so that several objects can be identified from the shot IMAGE1. In this case, the lower left-hand corner 19.1 of the sheet of paper 19 is selected to be the fixed point.

Next, when the user wishes to move the pointer cursor 13 on the display 11 from the point according to FIG. 1a to the point according to the FIG. 1b, i.e. from the centre of the user interface GUI to top of the icon 12.1, they moves, such as, for example, aims by turning the terminal device 10 in the vertical-horizontal direction in such a way that a change takes place in the mainly real-time video-image information detected by the camera means 14 that can be determined from the image information IMAGE1, IMAGE2. The turning, or more precisely the aiming of the camera means 14, can take place, for example, in the direction in which it is wished to move the pointer cursor 13 on the display 11. The camera means 14 detect at the set imaging frequency the view that changes as a result of the turning and capture a second shot IMAGE2 from the view (305). Next, the selected fixed point 19.1 is sought from the second viewfinder shot IMAGE2 and its location $[X_2, Y_2]$ is determined in the shot IMAGE2 (306).

Next, a calculation is performed, in which the direction and magnitude of the movement of the selected fixed point 19.1, between the viewfinder shots IMAGE1, IMAGE2, can be determined. It defines the movement vector S' of the element 13 (307).

It is generally possible to proceed by storing the captured first and second viewfinder shots IMAGE1, IMAGE2 in the memory means MEM of the terminal device 10 and giving them as input for the functionality 17 calculating the movement of the pointer cursor 13, arranged in the processor 16. The functionality 17, which can be formed of program code arranged in the memory means MEM, compares the shots IMAGE1, IMAGE2 with each other, in order to determine the change of location S of the selected one or several fixed points 19.1, between the different shots IMAGE1, IMAGE2. From these, the change M in the attitude or position of the device 10 can be determined, or by using some more developed image-comparison algorithms, which are arranged in connection with the device 10. Thus, the comparison operation can be considered very broadly and can be performed in many different ways, which are in no way restricted by the embodiments disclosed below. The movement S between the viewfinder shots IMAGE1, IMAGE2 can also be directly scaled to the movement vector S' in the user interface GUI.

According to a first embodiment, the comparison can be performed using one or several image-recognition algorithms 17.1. According to a second embodiment, optical algorithms 17.2 too can be applied for determining the change M affecting the attitude or position of the device 10. Of course, different types of algorithm can also be combined.

Some examples of such more developed image-comparison and optical data-flow analysis algorithms 17.1, 17.2 are listed in the list of references at the end of the description portion. The image-feature tracking method, such as, for example, edge searching, is described an example in reference [1], colour-blob definition algorithms are described in reference [2], and time-focussing colour-segmentation algorithms based, on clustering, are described in reference [3]. Some of the example algorithms evaluate the image-data flow by calculating a spatial-temporal gradient for the local intensity distribution, which cases are referred to in references [4] and [5]. The algorithms and methods are quite easily implemented to one versed in the art, for use according to the invention. The fixed-point method, based on image comparison, described above, is in fact only one possible embodiment for achieving a functionality according to the invention.

Figure 6A:
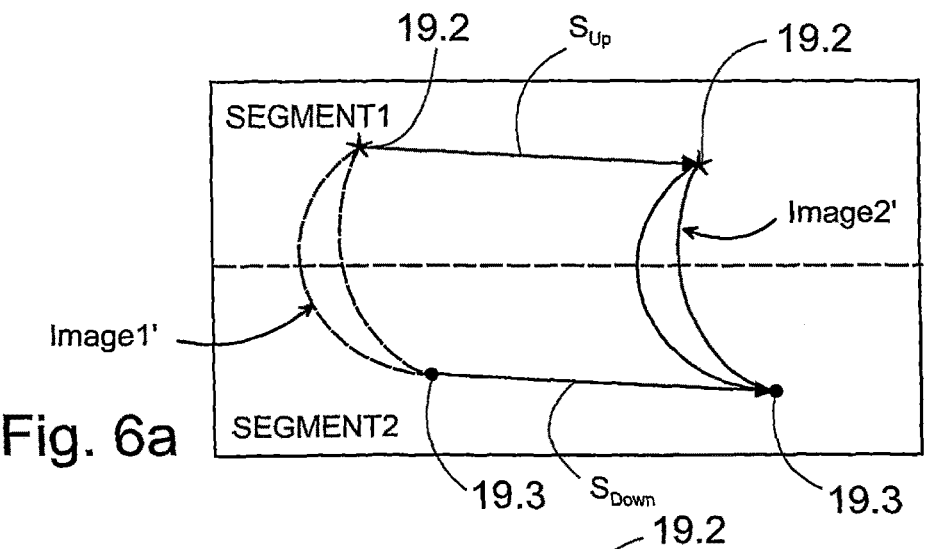
FIGS. 6a-6c show an example for determining a change in the attitude or position of the device, when applying optical data-flow algorithms to the invention.
Figure 6B:
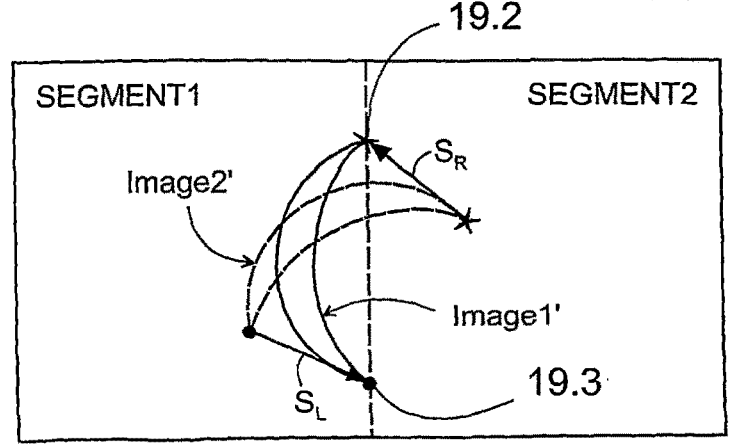
Figure 6C:
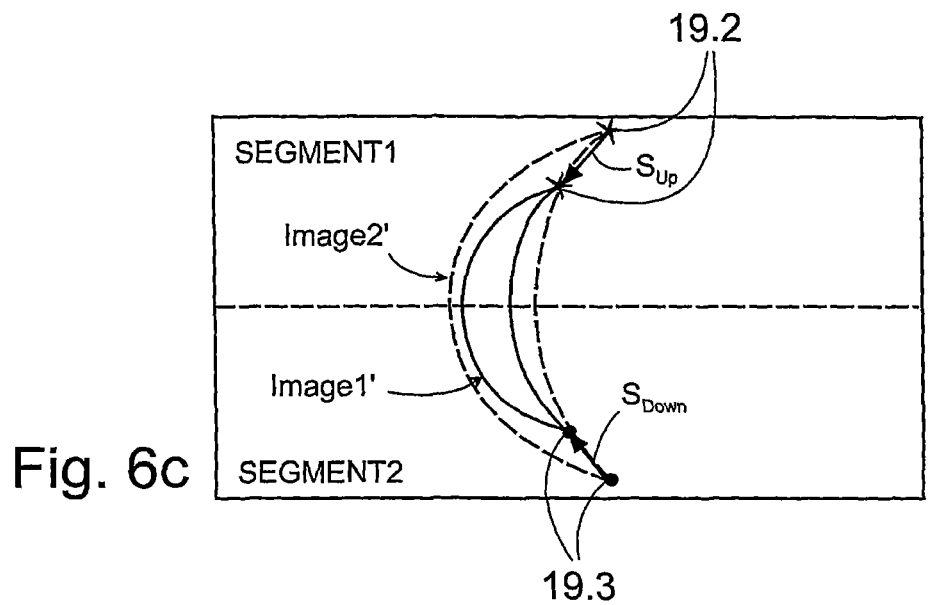

FIGS. 6a-6c show application to the invention of solutions based on optical data-flow analysis algorithms 17.2. For comparison, the figures show both object elements in the same image frame, which are now depicted by a crescent-moon shape. Both of the object elements two fixed points 19.2, 19.3 are shown, according to which the direction of the movement vectors can be easily perceived in each case. In the figures, the solid crescent moon is the object element before the change of attitude or position affecting the device 10 while the crescent moon drawn with a broken line is the object element after the change of attitude or position affected to the device 10.

In the solution based on optical data-flow algorithms 17.2, the shots IMAGE1, IMAGE2 selected from the mainly real-time image periods can each be divided into segments SEGMENT1, SEGMENT2 of a set size and shape in a selected manner (stages 303 and 305). After segmentation, which, in terms of its coarseness, must be understood in the cases according to FIGS. 6a-6c as being very much by way of an example, one or several movement vectors $S_R$, $S_L$, $S_{Up}$, $S_{Down}$, which are proportional to the attitude or position change M affecting the device 10, and which arise as a result of the change in view, can be determined from at least some of the selected segments from the shots IMAGE1, IMAGE2 (stage 307). The total change M in the attitude and position of the device 10 can be determined by combining all, or at least some of the defined movement vectors $S_R$, $S_L$, $S_{Up}$, $S_{Down}$ of the segments.

In FIG. 6a, the device 10 has been rotated towards the right, in accordance with the above. As a result, all the movement vectors $S_R$, $S_L$ of the defined image segments point towards the right. The length of the movement vectors $S_R$, $S_L$ depends on the speed of the change, i.e. the change of the fixed point/segment 19.2, 19.3 in image frame IMAGE1', IMAGE2'.

The above description of the control of the user interface GUI and the applications of the device 10 concerned the case of a two-dimensional embodiment (FIG. 5, directions 4). In that case, the device 10 can be turned not only to the right and left, but also turned in the up-down direction, or in some combination of these directions.

According to the direction definition 5 shown in the set of co-ordinates shown in FIG. 5, the device 10 can also be tilted counter-clockwise around an imaginary axis of rotation running through it. With reference to FIG. 6b, in which optical data-flow algorithmics are applied, the movement vectors $S_R$, $S_L$, defined from the right-hand edge of the shots IMAGE1', IMAGE2', point upwards in the image frame, the movement vectors $S_R$, defined from the upper edge point towards the left, and the movement vectors $S_L$, defined from the lower edge, point towards the right. A second, slightly simplified embodiment for this is to use the camera sensor 14 to identify a change in the orientation of the imaged object, for example, from a landscape/horizontal orientation to a portrait/vertical orientation.

Further, according to the third direction definition 6 shown in FIG. 5, the device 10 can be either pushed away from, or pulled closer to the user O. The change M affected to the attitude or position of the device 10, as shown in FIG. 6c, can now be detected from the movement vectors $S_{Up}$, $S_{Down}$, which correspondingly either point away from the centre point of the image frame if the device 10 has been pulled closer to the user, or towards the centre point of the image frame, if the device 10 has been pushed away from the user, as has just happened in FIG. 6c. Another, simpler embodiment for this is such that the camera sensor 14 on the opposite side of the device 10 to the user and the display 11 is used to identify the enlargement or reduction of the imaged object in the image information IMAGE1', IMAGE2', which is caused by the corresponding movement of the device 10 towards or away from the user.

A mean value can also be defined in a set manner using at least some of the movement vectors $S_R$, $S_L$, $S_{Up}$, $S_{Down}$. This achieves an advantage, for example, in a case in which there are moving objects in the view detected by the camera sensor 14, such as, for example, people or vehicles. These may cause slight errors in the definition of the movement vectors. The error can, however, be eliminated by selecting and/or averaging the movement vectors, and, on the other hand, by the factor that moving objects are often only in some limited area of the image information IMAGE1, IMAGE2.

On the other hand, the averaging of the movement vectors will also increase the precision of the control of the position of the element 13 in the display 11, which is thus shown in its entirety on the display 11. When the element 13 acts as a cursor or game character, it control will demand particular precision, compared, for example, at least to applications, in which the invention is applied to controlling an object that is content-rich and will not fit at one time completely on the display 11 (for example, browsing a map or a website).

The methods referred to above may vary greatly in terms of their algorithmics.

The movement S and its speed defined in the processor functionality 16 are adapted to be suitable for the display component 11 and the user interface GUI in stage 307, taking into account the selected form of control and the manner of calculating the movement S', according to which the pointer cursor 13 is then moved on the display 11 to a corresponding degree (stage 309) in a set manner. Next, a loop can be made back to stage 302.

Numerous such processing and comparisons of the first and second viewfinder shots IMAGE1, IMAGE2, and thus definitions of the movements S' of the pointer cursor 13 can be made during a single movement interval intended by the user. This will create a smooth movement in the cursor 13 in real time, so that, during the time of the change in attitude or position that they have directed to the device 10, the user can control the movement of the cursor 13 to the point they wish in the user interface GUI and, on the basis of that, can make possible corrective movements affecting the amount and direction of movement of the device 10. In addition, it should be understood that the following fixed point 19.1 of the image-comparison pair can be selected, for example, from the second viewfinder shot IMAGE2 of the previous image information comparison pair. Thus, the previous and following comparison pair can, in some way, slightly overlap each other. This also permits the prediction of the location of the fixed point.

Figure 7:
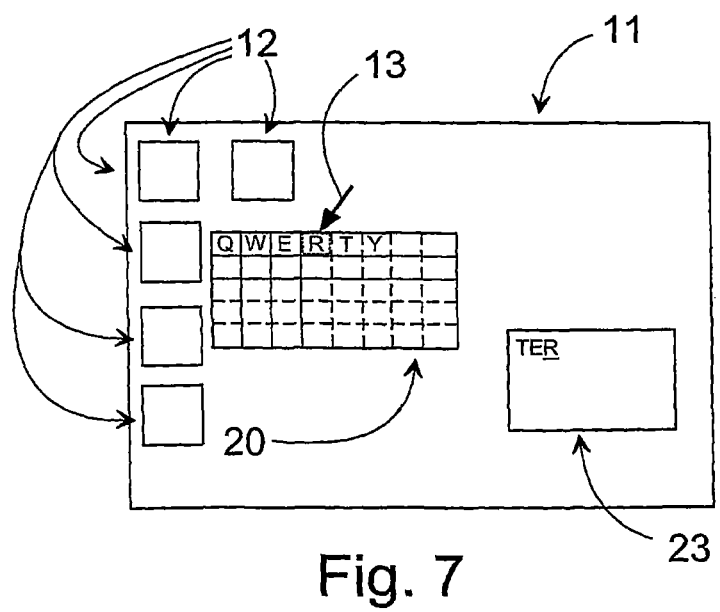
FIG. 7 shows an example of text input and the arrangement of the user interface, when using the solution according to the invention.

One example of a way to arrange the user interface GUI in a device 10 according to the invention is, according to what is shown in FIG. 7, to arrange the application icons 12 at the edges or corners of the user interface GUI shown on the display 11. The user can then rotate the device 10 in the direction that will allow them to activate the icon 12 of their desired application. On a general level, this corresponds to a change affecting the attitude of the device 10. On a conceptual level, the operation corresponds to the control of the cursor 13 using, for example, a joystick key.

According to one embodiment, the activation of an application, the selection and/or confirmation of a function, or the movement of a game character, for example in a 3D game, can also be performed by changing the attitude or position of the device 10. This can take place, for example, by the user pushing the device 10 away from themselves (FIG. 5, direction 6). The rotation of the device 10 relative to an imaginary axis of rotation running through the camera sensor 14 can also be interpreted as an operation triggering an application, or a turn affecting a game character (FIG. 5, direction 5). The trigger sensitivity, i.e. the magnitudes and speeds required in the changes in attitude and position affecting the device 10, defined from the image information IMAGE1, IMAGE2 can be set, for example, by the user from the user interface settings.

FIG. 7 shows yet another application, in which the invention can be used. Text can also be entered using the invention. In this case, a collection of characters, for example a virtual QWERTY keyboard 20, arranged for the display 11 of the device 10, can be shown in its entirety on the display 11. The cursor 13 can be moved over the keyboard 20, so that the character at the current location of the cursor 13 will be active. The fact that the character is active can be shown, for example, by a different visual appearance, examples of which are the framing of the character, or a lighting effect that differs from the other characters.

When writing a text, the user can move the cursor 13 on top of the character they desire in a manner according to the invention and select the character in a manner described above, for example, by pushing the device 10 away from themselves. This will cause the character to appear, for example, in an editor window 23, or corresponding application in which it is then wished to enter the character.

The change in position of the device 10 (FIG. 5, direction 6) can also be applied in menu browsing. In that case, the device 10 can, for example be pushed away from the user to make an upward movement the menu and correspondingly, the device 10 can be brought closer to the user to make a downward movement. The invention has a wide range of possibilities.

In the method according to the invention, the camera means 14 are used to detect in order to identify a change in the image information, for example, consecutive, or at least nearly consecutive views from a video-image information flow, the detection frequency of which can correspond, for example, to that in conventional video/viewfinder imaging operation. On the other hand, the detection or processing frequency can also be adjusted, so that it can deviate from conventional video-imaging operation. For example, the frequency can be adjusted to be slower, if, for example, the view being detected and the speed of change of the attitude or position of the device 10 permit this. Thus, the camera means 14, 15 can form image information IMAGE1, IMAGE2 at even substantially less frequently compared to the conventional image-information formation frequency (for example, 1-5 frames per second, but nevertheless fewer than 15-30 frames per second). The embodiment does not necessarily require such a large processing capacity in the image-processing algorithms.

The slowing of the frequency is possible, for example, using the assumption that the change in the direction of aim of the device 10 or generally in its attitude or position take place at a reasonably slow rate and thus at a low change in the image-information.

In that case, the processing or comparison of the viewfinder shots IMAGE1, IMAGE2, IMAGE1', IMAGE2' must still be performed and the currently selected fixed point 19.1-19.3 can still be found in the first and second viewfinder shots IMAGE1, IMAGE2, IMAGE1', IMAGE2'. On the other hand, such a slow rate of change in the attitude or position of the device 10 can also be quite expected in order to enable following of the pointer cursor 13 that takes place in the user interface GUI, because, in large changes of attitude and position of the device 10 that performed rapidly, the user may not necessarily able to observe the movement of the pointer cursor 13 that takes place in the rather small display 11, never mind other events that are shown on the display 11. Such a less frequent detection frequency of the viewfinder-shots IMAGE1, IMAGE2 is achieved among others, the additional advantage of saving power, in the cases of both only detection performed using the camera means 14 and also of the calculation of the movement S' determined form the viewfinder shots IMAGE1, IMAGE2.

Further, such a less frequent detection frequency also enables that for the sensor 14 that detects the changes in the attitude or position of the device 10 is not necessarily required, for example, high-quality digital-imaging properties, but its properties can be even poorer quality. The image-processing chain 15 can also have lightened properties.

If, when controlling the user interface GUI, the attitude or position of the device 10 changes suddenly as can happen, for example, when the user is walking, the pointer cursor 13 may then also move quite uncontrollably on the display component 11, according to the corresponding changes of view detected by the camera sensor 14. Some examples of such situations are, for example, the cursor 13 swinging from side to side on the display 11 in time with the walking rhythm and/or in an up and down direction when walking forwards, when the view detected by the sensor 14 changes as the landscape changes. To resolve such operating situations, there can also be a functionality in the device 10, that determines the movement S' affecting the pointer cursor 13 from image information detected in front of the camera sensor 14, only at desired moments.

One alternative for implementing this can be such that, when it is wished to move the cursor 13, some key arranged suitably in the keypad 18 is pressed and kept down, until the cursor 13 is made to move to the desired point. This sub-stage can be between blocks (302) and (303) in the flow-chart presentation shown in FIG. 3, in which is it possible to check whether it is wished to move the cursor 13 at that moment. One example of such a key can be a selection/confirmation key (YES) or similar. When the key is kept continuously pressed down, the cursor 13 is moved on the display 11 in relation to the change detected by the camera sensor 14 as a result of a change in the attitude or position of the device 10 in the changing image information. When the cursor 13 reaches the desired location in the user interface GUI, the pressure on the key is released, thus simultaneously confirming the selection. In addition, a rapid state of movement of the device/view can also be detected from the viewfinder shot IMAGE1, IMAGE2, when the detection frequency can also be raised to correspond to the state of movement.

Yet another criterion in adjusting the imaging or processing frequency can be the power capacity of the device 10 at the time, in which case the frequency can be reduced when the power capacity is limited. The user can then be informed in the user interface GUI that there is reason to change the attitude or position of the device 10 gently and with controlled movements.

According to one embodiment, the selection of the fixed points 19.1-19.3, or more generally the elements 19 in the view, can also take place in such a way that more of them are selected from the viewfinder shot IMAGE1, for example, from different sides of it and/or from its corners. It will then be more difficult to lose the selected fixed points 19.1-19.3 when the attitude or position of the device 10 changes, than if only a single fixed point would be selected and/or when using a reduced detection frequency.

Further in addition, data on the direction of movement of the device 10 determined from consecutive viewfinder shots IMAGE1, IMAGE2 can also be used in the selection of the fixed points 19. The fixed point 19.1-19.3 of the following image-information comparison pairs can then be selected from the direction of the viewfinder shot IMAGE1, to which the device 10 has been turned, or the direction in which the user, for example, is moving. This will further reduce the risk of losing the fixed point 19.

The examples of applications disclosed above observed the change in the imaging information caused by a change in the attitude or position affecting the device 10, relative to at least one set fixed point. On the other hand, the device 10 can also be held stationary and the controlled changing view moving in front of it can be observed, in order to form element movements. In that case the user can hold the device 10, for example, in one hand while changing the attitude or position of their other hand, in order to form the function they wish, in front of the device 10 and the camera sensor 14. In that case, some suitable algorithm can be used to detect the change in the attitude or position of the device 10 relative to the fixed point, i.e. the hand, and on that basis to control the operation of the element 13.

Figure 8:
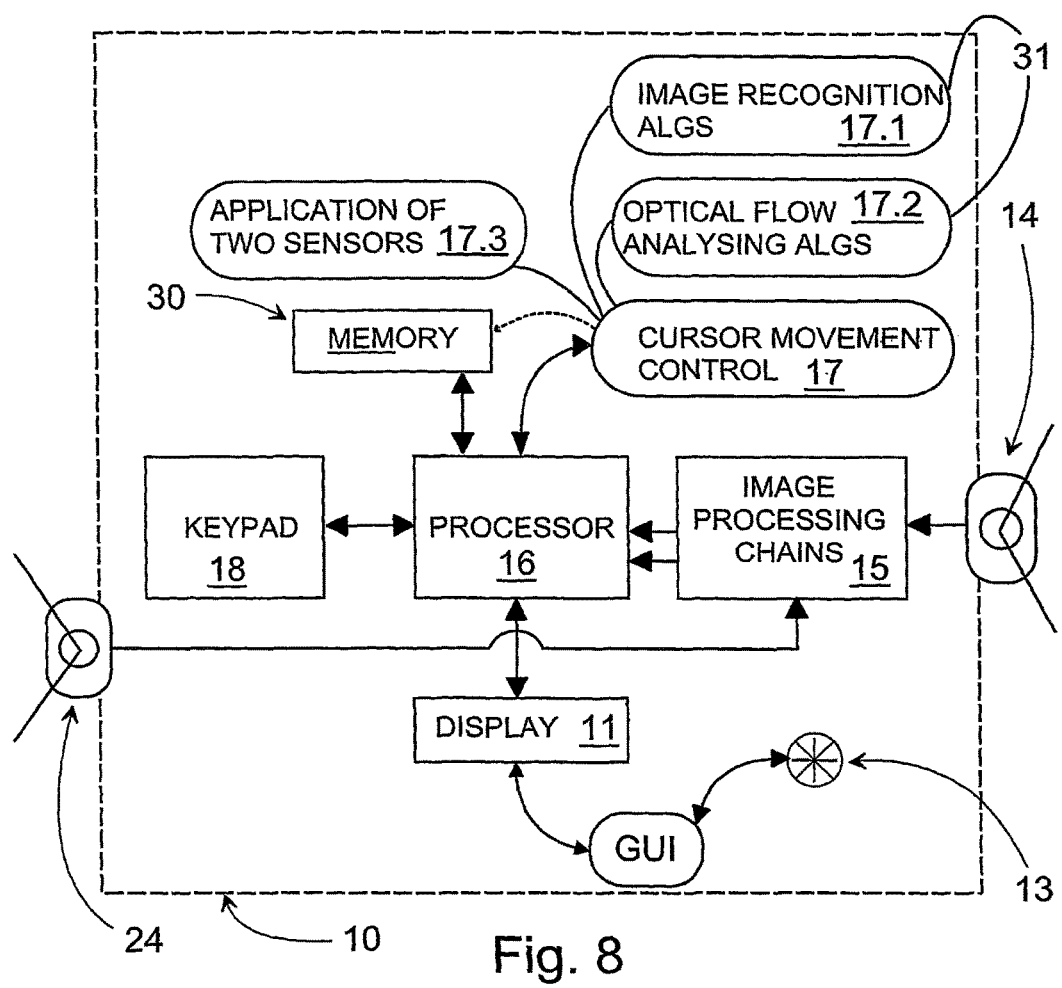
FIG. 8 shows a second example of the device according to the invention, when applying two cameras.
Figure 9:
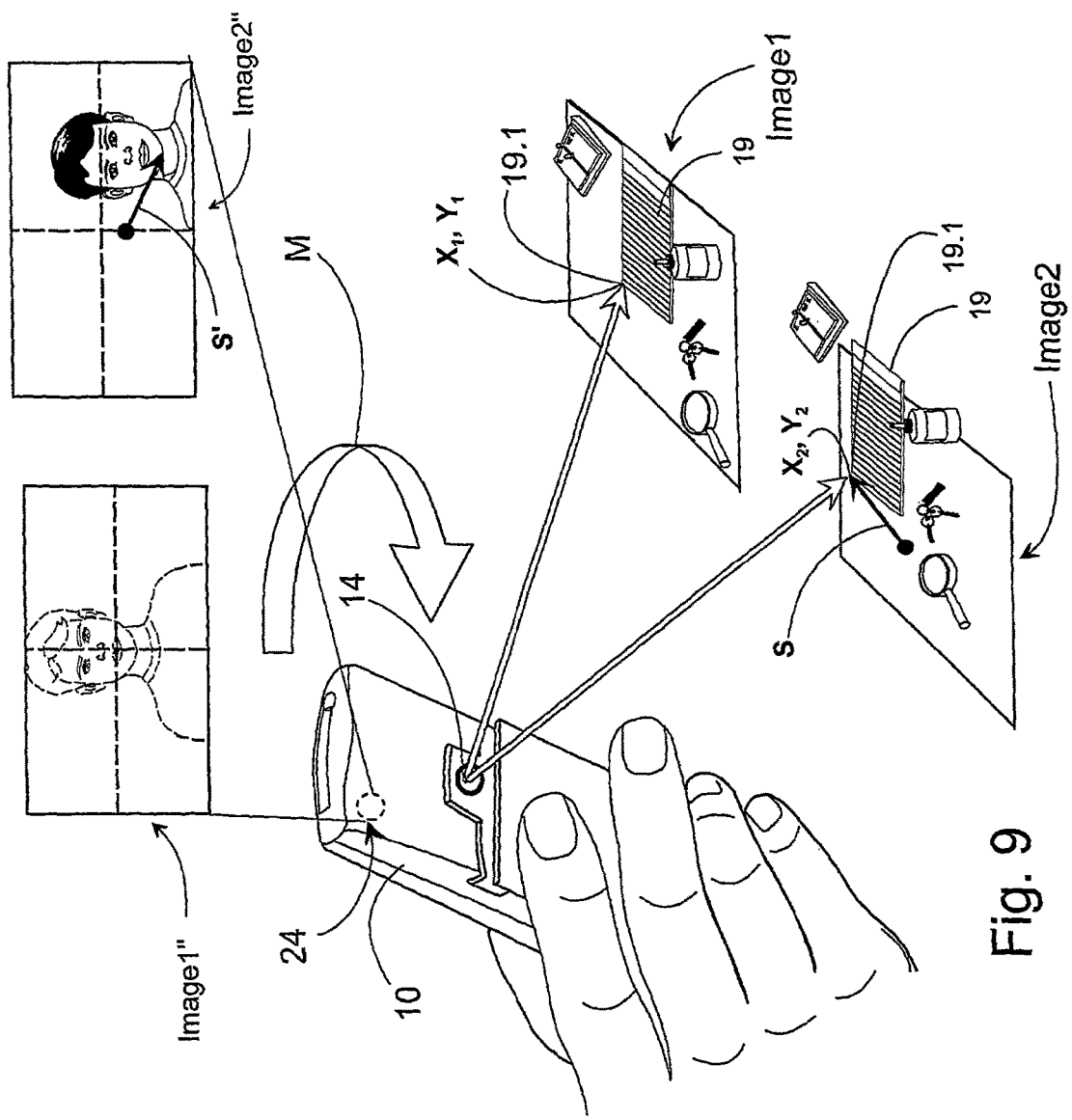
FIG. 9 shows a perspective view of an example of the method according to the invention, when applying two cameras.
Figure 10:
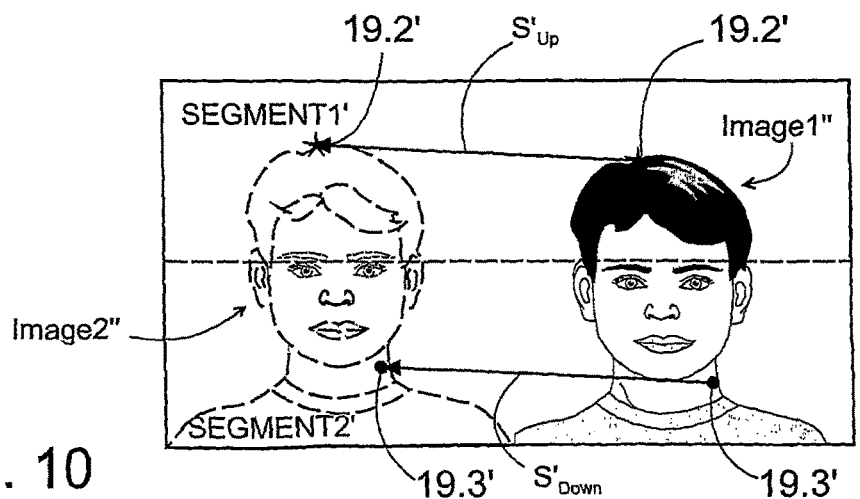
FIG. 10 shows an example of the definition of a change affecting the attitude of the device, in the case of an embodiment incorporating two cameras.

FIGS. 8-10 shows yet another embodiment of the invention. FIG. 8 shows a device application concerning this, the reference numbering and component depiction of which correspond mainly to the case according to the case of FIG. 2. However, there are now at least two camera units 14, 24 in the device 10. In addition to the camera unit 14 directed to the rear side of the device 10, there is also a camera unit 24 in the device directed to its front side. This camera unit 24 is conventionally used in video-conferencing applications, but it can now also be used surprisingly in the control of the functions of the device 10 according to the invention. The camera 24 aimed at the user of the device 10 is in data-transfer connection with the imaging chain 15, which in this case is shown for reasons of simplicity as being common to both cameras 14, 24. As the sub-stages of the method, reference is made to FIG. 3 above, which can also be tailored directly for two cameras 14, 24.

FIG. 9 shows an embodiment, in which both camera units 14, 24 are used. Now, when the device 10 is re-aimed, the position of the user in the image changes between the image frames IMAGE1", IMAGE2" formed by the front-side camera 24. The arrow S' depicts this change, which is in the opposite direction to the change S in position detected by the rear-side camera 14. It should be understood that in this connection the images IMAGE1, IMAGE2, IMAGE1", IMAGE2" are only by way of example. When the attitude or position of the device 10 changes, the changes in the view in the image frame can take place in a different way to that shown in FIG. 9.

FIG. 10 shows an extremely rough example of the image frames IMAGE1", IMAGE2" formed from the front side. The application is analogous to, for example, the segmentation examples shown in FIG. 6a, which can now represent the image information formed simultaneously from the rear side of the device 10, if the device 10 is turned towards the left. The solid outline of the user shows the image subject in the image IMAGE1" while the broken-line outline of the user shows the image subject in the image IMAGE2". Now, however, the direction arrows $S_{Up}'$, $S_{down}'$ of the segments SEGMENT1', SEGMENT2' are in the opposite direction to those in the view formed from the rear side. The function according to the embodiment can be arranged as a code means 17.3 in the program code 17. This is used to interpret the directions and magnitudes of the front and rear-side direction arrows and combined effect is calculated in a set manner, in order to define the desired control effect. Because the imaging properties of the camera 24 on the videoconferencing side and those of the camera 14 arranged on the rear side of the device 10 generally differ from each other, for example, in terms of their sets of lenses/image area, the magnitudes of the movement vectors formed on the different sides also become different. However, the ratio of the magnitudes is known, from which it is possible to use the code means 17.3 to define and scale, for example, the movement set for the cursor control. In this case, the top of the user's head and the right-hand edge of his neck in the view of the videoconferencing camera 24 act as the fixed points 19.2' 19.3'.

Owing to the embodiment, the precision of the method is improved in a surprising manner, by using simultaneously both cameras 14, 24, so that the movement vectors S' of the one camera 24 point in the opposite direction to those of the other camera 14. Further, the possible difference of the properties of the camera units 14, 24 (double definition) bring an additional improvement to this. On the basis of this, the functionality of the method can be substantially improved, which is significant, for example, in the precise control of elements visualized on small displays.

The movement of the object 13 appearing on the display 11 in other that the basic direction variations (4, 5, 6) shown in FIG. 5 can be determined from the displacement components of the basic directions (4, 5, 6) shown in FIG. 5, which are combined to form a final movement vector corresponding to the attitude or position of the device 10.

The invention permits fingerless control of the functions of the device 10, so that it is easier than before to use the device 10, even when wearing gloves. In game applications, control based on the change in attitude or position of the device 10 will make the game effect even more gripping. In addition, hardware-level arrangements are no longer needed to control the device 10, such as, for example, acceleration sensors or attitude sensor, so that the construction of the device 10 is simplified and its manufacturing costs are reduced.

By means of the multi-dimensional movement of the device 10, an extremely pleasant and gripping experience of controlling its operations is achieved. The very latest user interface concepts, which have even three-dimensionality, can be easily controlled by using changes affecting the attitude or position of the device. In addition, highly-developed sensor technology and image-analysis algorithmics make the invention surprising with its diverse control possibilities.

The invention also relates to a program product 30 for implementing the method, which includes codes 17, 17.1, 17.2, 17.3 to be executed, such as, for example, commands to be implemented consecutively in a set order, to implement functionalities according to the method in an electronic device 10.

It must be understood that the above description and the related figures are only intended to illustrate the present invention. In particular, the definition of the control operations of the element 13 and the image-comparison methods can be selected and implemented in numerous different ways. The invention is thus in no way restricted to only the embodiments disclosed or stated in the Claims, but many different variations and adaptations of the invention, which are possible within the scope on the inventive idea defined in the accompanying Claims, will be obvious to one versed in the art.

What is claimed is:

1. A method comprising:
capturing, via a camera unit of a portable device, at least two images;
dividing a first image of the at least two images into a first plurality of segments, each of the first plurality of segments having a set shape and size;
selecting a fixed point from at least one segment of the first plurality of segments of the first image;
determining a first location coordinate of the selected fixed point from the at least one segment of the first plurality of segments of the first image;
dividing a second image of the at least two images into a second plurality of segments, each of the second plurality of segments having the set shape and size, the second image being the next image following the first image of the at least two images;
determining a second location coordinate of the selected fixed point from at least one segment of the second plurality of segments of the second image;
calculating a movement vector of the selected fixed point between the first determined location coordinate and the second determined location coordinate;
determining a change relative to at least the movement vector; and
controlling a visual controllable element on a display of the portable device based on the change.

2. The method according to claim 1, further comprising adjusting an image frequency of the camera unit to at least a movement speed of the portable device.

3. The method according to claim 1, wherein the portable device is operable in a plurality of operating situations, wherein one of the plurality of operating situation is defined based on a movement speed of the portable device.

4. The method according to claim 1, wherein the change is three-dimensional.

5. The method of claim 1, wherein the camera unit comprises at least two cameras on opposite sides of the portable device.

6. The method according to claim 1, further comprising defining a mean value for at least the movement vector.

7. The method of claim 1, further comprising adjusting a determination frequency of the change according to an operating situation of the portable device.

8. The method of claim 1, wherein the visual controllable element comprises a pointer cursor.

9. The method of claim 1, wherein the first and second images are essentially consecutive.

10. A portable device comprising:
a display;
a camera unit;
a memory including program code;
a processor; and
the memory and the program code being configured with the processor to cause the portable device to:
capture, via the camera unit of a portable device, at least two images;
divide a first image of the at least two images into a first plurality of segments, each of the first plurality of segments having a set shape and size;
select a fixed point from at least one segment of the first plurality of segments of the first image;
determine a first location coordinate of the selected fixed point from the at least one segment of the first plurality of segments of the first image;
divide a second image of the at least two images into a second plurality of segments, each of the second plurality of segments having the set shape and size, the second image being the next image following the first image of the at least two images;
determine a second location coordinate of the selected fixed point from at least one segment of the second plurality of segments of the second image;
calculate a movement vector of the selected fixed point between the first determined location coordinate and the second determined location coordinate;
determine a change relative to at least the movement vector; and
control a visual controllable element on the display of the portable device based on the change.

11. The portable device of claim 10, wherein the camera unit includes at least two cameras on opposite sides of the portable device.

12. The portable device of claim 10, wherein the change is three-dimensional.

13. The portable device of claim 10, wherein the visual controllable element comprises a pointer cursor.

14. The portable device of claim 10, wherein the first and second images are essentially consecutive.

15. The portable device of claim 10, wherein the memory and the program code are further configured with the processor to cause the portable device to:
define a mean value for at least the movement vector.

16. The portable device of claim 10, wherein the memory and the program code are further configured with the processor to cause the portable device to:
a determination frequency of the change according to an operating situation of the portable device.

17. A computer-program product comprising a non-transitory computer-usable medium having computer-readable program code embodied therein, the computer-readable program code adapted to be executed to:
capture, via a camera unit of a portable device, at least two images;
divide a first image of the at least two images into a first plurality of segments, each of the first plurality of segments having a set shape and size;
select a fixed point at least one segment of the first plurality of segments of from the first image;
determine a first location coordinate of the selected fixed point from the at least one segment of the first plurality of segments of the first image;
divide a second image of the at least two images into a second plurality of segments, each of the second plurality of segments having the set shape and size, the second image being the next image following the first image of the at least two images;
determine a second location coordinate of the selected fixed point from at least one segment of the second plurality of segments of the second image;
calculate a movement vector of the selected fixed point between the first determined location coordinate and the determined location coordinate;
determine a change relative to at least the movement vector; and
control a visual controllable element on a display of the portable device based on the change.

* * * * *